Jan. 13, 1970  M. N. PEARCE ET AL  3,489,284
FILTER DEVICE
Filed Dec. 18, 1967  2 Sheets-Sheet 1
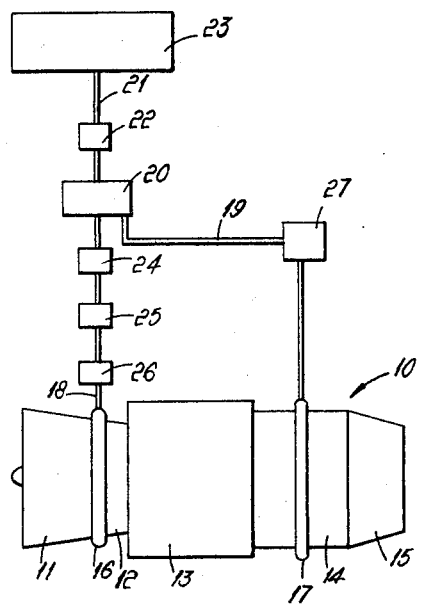
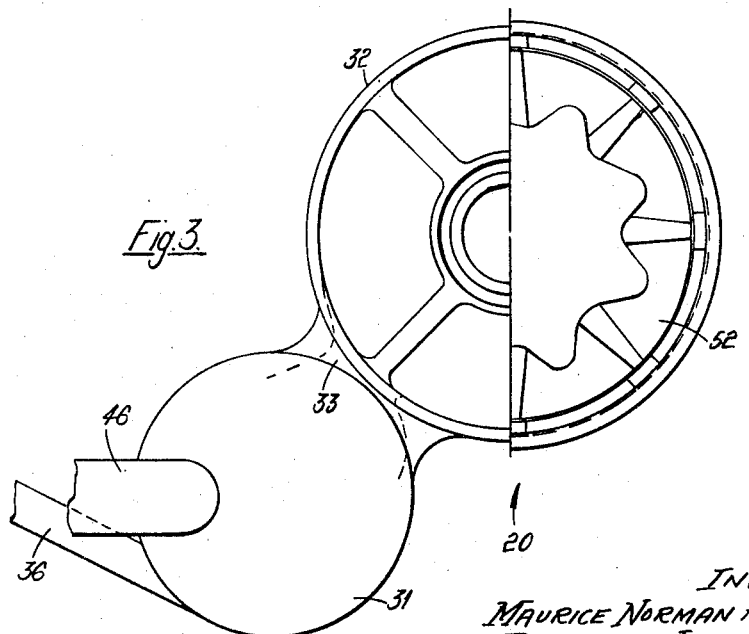
INVENTORS
MAURICE NORMAN PEARCE
RAYMOND HART
ROBERT BERNARD SHATFORD
CYRIL REX GOODWIN
By Cushman, Darby & Cushman
Attorneys

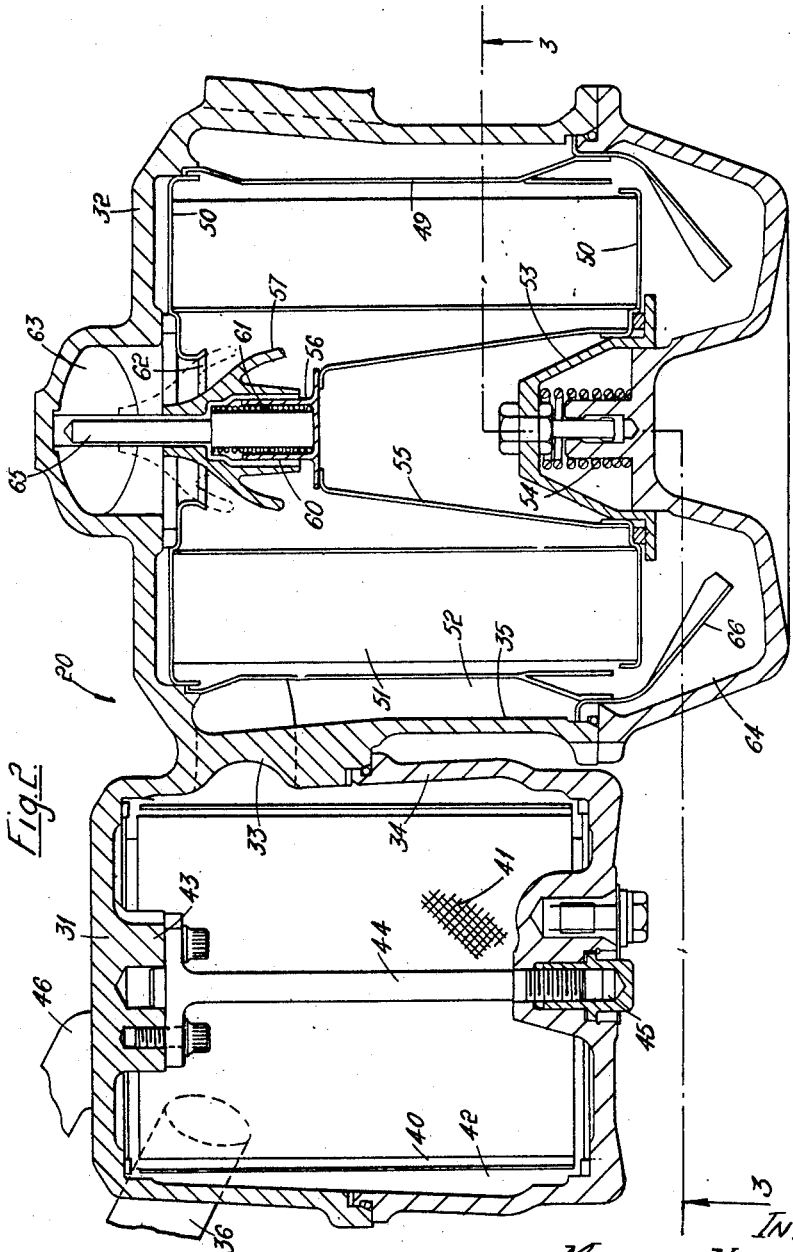

United States Patent Office 3,489,284
Patented Jan. 13, 1970

3,489,284
FILTER DEVICE
Maurice Norman Pearce, Raymond Hart, Robert Bernard Shatford, and Cyril Rex Goodwin, Derby, England, assignors to Rolls-Royce Limited, Derby, England, a British company
Filed Dec. 18, 1967, Ser. No. 691,396
Claims priority, application Great Britain, Jan. 27, 1967, 4,294/67
Int. Cl. B01d 35/22, 35/00
U.S. Cl. 210—234                 5 Claims

ABSTRACT OF THE DISCLOSURE

A filter device comprising a liquid conduit having first and second substantially cylindrical chambers each adapted to contain a filter element, a liquid inlet duct communicating with the first chamber and disposed tangentially of the inner wall thereof, an intercommunicating duct extending between the chambers and disposed tangentially of the inner walls thereof, and first and second outlet passages respectively connected to the first and second chambers, the first outlet passage receiving liquid which has passed through the first filter element and the second passage receiving liquid which has cleaned the surface of the first filter element by flowing thereover, and has thereafter passed through the second filter element.

---

This invention concerns a filter device.

According to the present invention, there is provided a filter device comprising means defining a first chamber circular in cross section and adapted to contain a first filter element, means defining a second chamber circular in cross section and adapted to contain a second filter element, the filter elements placed in each said chamber having a respective central bore, a liquid inlet duct communicating with the first chamber to introduce liquid thereto substantially tangentially to the inner wall thereof an intercommunicating duct communicating tangentially with the inner walls of the first and second chambers to introduce tangentially into the second chamber liquid which has passed circumferentially around the first chamber, a first outlet duct arranged to communicate with the bore of the first filter element, and a second outlet duct arranged to communicate with the bore of the second filter element.

The second chamber is preferably provided with a trap in which sediment in the liquid is deposited. The trap may extend throughout an annular region adjacent the lower end of the inner wall of the second chamber. Thus the trap is preferably defined between the inner wall of the second chamber and an annular frusto-conical member which is mounted within the second chamber and converges towards the bottom thereof.

The second chamber may be adapted to contain the second filter element by means of a frame which may be removed from the second chamber and which has a passage through it arranged to communicate with the bore of the second filter element, the frame having an aperture therein for the passage of the filtered liquid to the second outlet duct, there being provided a valve for controlling flow through said aperture, resilient means for urging the valve towards the closed position, and abutment means which, when the said frame is operatively connected therein, engage the second chamber to effect opening of the valve against the action of the resilient means, whereby when the frame is removed from the second chamber, the valve is closed by the resilient means.

The invention is illustrated, merely by way of example, in the accompanying drawings, in which:

FIGURE 1 is a diagrammatic view of a gas turbine engine provided with a filter device according to the present invention, FIGURE 2 is a sectional view on a larger scale of the filter device of FIGURE 1, and FIGURE 3 is a diagrammatic view, partly elevational, partly in cross-section taken on the line 3—3 of FIGURE 2.

In FIGURE 1 there is shown a gas turbine engine 10 having in flow series a compressor or compressors 11, main combustion equipment 12, a turbine or turbines 13, reheat combustion equipment 14, and a final nozzle 15.

The main combustion equipment 12 and the reheat combustion equipment 14 have fuel manifolds 16, 17 respectively. The latter are supplied with fuel, via pipes 18, 19 respectively, from a common filter device 20.

The filter device 20 is supplied, via a pipe 21 containing a backing pump 22, with fuel from a tank 23.

The pipe 18 has connected therein in flow series a main fuel pump 24, a main fuel supply control unit 25, and a fuel cooled oil cooler 26 which cools the engine lubricating oil by passing it in heat exchange relationship with the fuel. The pipe 19 has connected therein a reheat fuel supply control unit 27.

As shown in FIGURES 2 and 3, the filter device 20 comprises a filter block having substantially cylindrical chambers 31, 32 therein with an intercommunicating duct 33 extending therebetween.

The intercommunicating duct 33 is disposed tangentially of the inner walls 34, 35, of the chambers 31, 32, while an inlet duct 36 is disposed tangentially of the inner wall 34 of the chamber 31. Thus fuel entering the chamber 31 from the pipe 21 and through the inlet duct 36 will flow successively in contact with the inner walls 34, 35.

Mounted coaxially within the chamber 31 is a cylindrical frame 40 which supports a cylindrical fine wire cloth gauze filter element 41 which is separated from the inner wall 34 by an annular space 42. The frame 40 is retained in position by a cap 43, bolt 44, and nut 45. Fuel which has passed from the annular space 42 and through the gauze filter element 41 to the centre of the frame 40 may pass out thereof through an outlet passage 46 which leads to the pipe 19 and so to the reheat combustion equipment 14.

Mounted coaxially within the chamber 32 is a cylindrical frame 49 which can be removed from the chamber 32, the frame 49 being provided with end caps 50. The frame 49, which has holes (not shown) in the side wall thereof for the flow of fuel therethrough, supports a paper filter element 51 which has been given a pleated, tubular shape, and which is separated from the inner wall 35 by an annular space 52. The filter element 51, together with the frame 49 and end caps 50, are retained by a cap 53 between which and the bottom of the chamber 32 there is interposed a spring 54.

Mounted centrally within the frame 49 is a support member 55 on which is mounted a sleeve 56. A valve 57 has an inverted cup-shaped portion 60 which is slidably mounted on the sleeve 56, a spring 61 being mounted within the inverted cup-shaped portion 60 and engaging the sleeve 56. The valve 57 controls fuel flow through an aperture 62 in the frame 49 and towards an outlet passage 63.

Fuel which has passed from the annular space 52 has its swirl momentum destroyed by having to pass through the said holes in the side wall of the frame 49 before reaching the filter element 51. This helps to promote sediment fall out into a trap 64, and also helps to prevent swirling fuel from stirring up the sediment in the trap 64. After passing through the filter element 51, the fuel flows through the passage provided by the space within the latter and out through the aperture 62 in the frame 49, the valve 57 normally allowing flow through the aperture 62. The fuel which has passed through the aperture 62 flows through the outlet passage 63 and the pipe 18 to the main fuel pump 24 and so to the main combustion equipment 12.

As will be appreciated, the spring 61 urges the valve 57 towards the closed position. The valve 57, however, is provided at its top with an abutment rod 65 which, when the frame 49 is operatively connected in the chamber 32 as shown in FIGURE 2, engages the top of the chamber 32 to effect opening of the valve 57 against the action of the spring 61. When, however, the bottom of the chamber 32 and the frame 49 are removed so that the filter element 51 can be cleaned or replaced, the valve 57 will move to the dotted line position to close the aperture 62 and thus prevent contamination of the interior of the frame 49 and of the filter element 51.

Mounted within the lower part of the chamber 32 is an annular frusto-conical member 66, the member 66 tapering towards the bottom of the chamber 32. The member 66 defines with the lower end of the inner wall 35 an annular region which constitutes the trap 64 in which sediment in the fuel may be deposited and retained.

In operation and when reheat is in use, fuel enters the chamber 31 tangentially through the inlet duct 36 and is urged by centrifugal force to swirl around the inner surface 34 and thus pass through the annular space 42. The greater part of the fuel flows through the gauze filter element 41 and out through the outlet passage 46 and pipe 19 to the reheat fuel supply control unit 27 and so to the reheat combustion equipment 14. Any sediment in the portion of the fuel passing to the reheat combustion equipment 14 will thus be left on the external surface of the gauze filter element 41, but this sediment will be washed off by the flow of fuel passing to the chamber 32.

The latter flow passes tangentially through the intercommunicating duct 33 and thence tangentially over the inner wall 35 of the chamber 32, the flow then passing through the said holes in the side wall of the frame 49 and thence through the filter element 51 to the outlet passage 63 and main combustion equipment 12. Within the chamber 32 the sediment within the fuel is centrifugally separated and collects in the trap 64, and this sediment includes that which has been washed off the gauze filter element 41 by the flow of fuel.

When reheat is not in use, no fuel will pass through the gauze filter element 41, but the fuel will still pass over the external surface of the latter, in flowing through the conduit constituted by the annular space 42, intercommunicating duct 33 and annular space 52.

Thus the external surface of the gauze filter element 41 will be cleaned by the flow of fuel over it whether the fuel is passing to both the outlet passages 46, 63 which are arranged in parallel or only to the outlet passage 63.

We claim:

1. A filter device comprising means defining a first chamber circular in cross-section and adapted to contain a first filter element, means defining a second chamber circular in cross section and adapted to contain a second filter element, said first and second filter elements being placed in said first and second chambers, respectively, each of said filters having a respective central bore therethrough, a liquid inlet duct communicating with said first chamber in a manner as to introduce liquid therein substantially tangentially of the inner wall thereof, an intercommunicating duct communicating tangentially with the inner wall of said first chamber and communicating tangentially with the inner wall of said second chamber liquid which has passed circumferentially around said first chamber, a first outlet duct arranged to communicate with said bore of said first filter element and adapted to receive fuel which has passed through said first filter element, and a second outlet duct arranged to communicate with said bore of said second filter element and adapted to receive fuel which has passed through said second filter element.

2. A filter device as claimed in claim 1 in which the means defining the second chamber also define a trap in which sediment in the liquid is deposited.

3. A filter device as claimed in claim 2 in which said trap is constituted by an annular region adjacent the lower end of the inner wall of the second chamber.

4. A filter device as claimed in claim 3 comprising an annular frusto-conical member which is mounted within the second chamber and converges towards the bottom thereof, the annular region being defined between said annular frusto-conical member and the inner wall of the second chamber.

5. A filter device as claimed in claim 1 in which the second chamber comprises a frame adapted to contain the second filter element and which may be removed from the second chamber, the frame having a passage through it arranged to communicate with the bore of the second filter element, and having an aperture therein for the passage of the filtered liquid to the second outlet duct, there being provided a valve controlling flow through said aperture, resilient means for urging the valve towards the closed position, and abutment means which, when the said frame is contained in the second chamber, engages the second chamber to open the valve against the action of the resilient means, whereby when the frame is removed from the second chamber, the valve is closed by the resilient means.

References Cited

UNITED STATES PATENTS

| 2,524,336 | 10/1950 | Vokes | 210—234 X |
| 2,544,244 | 3/1951 | Vokes | 210—234 |
| 3,120,490 | 2/1964 | Samson | 210—433 X |
| 3,154,485 | 10/1964 | Liddell | 210—247 X |
| 3,241,676 | 3/1966 | Neuville et al. | 210—433 X |
| 3,329,194 | 7/1967 | Miliacca | 210—258 X |
| 3,360,199 | 12/1967 | Sharpe | 210—433 X |

REUBEN FRIEDMAN, Primary Examiner

JOHN W. ADEE, Assistant Examiner

U.S. Cl. X.R.

210—247, 253, 260, 304, 433